Patented Feb. 14, 1928.

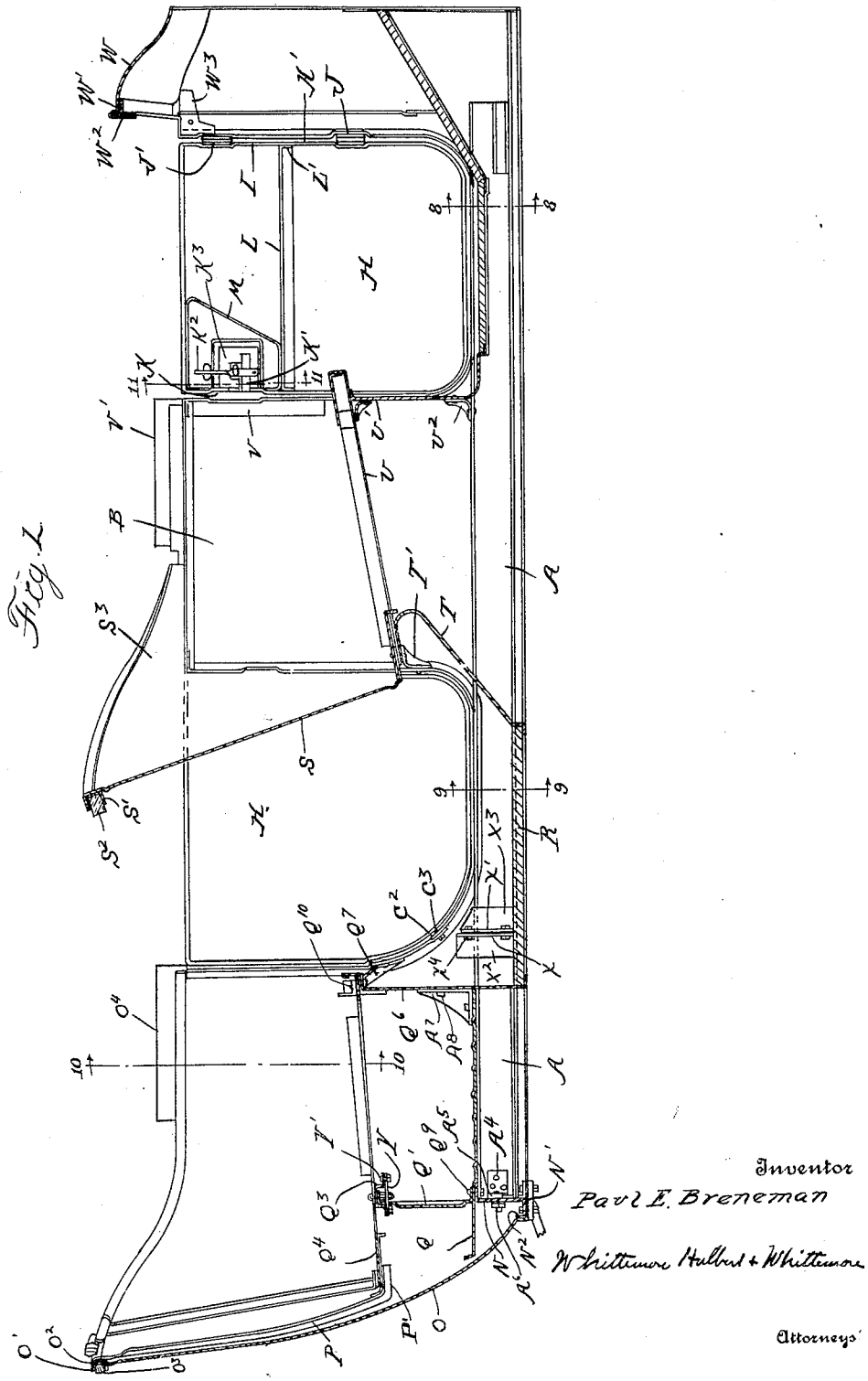

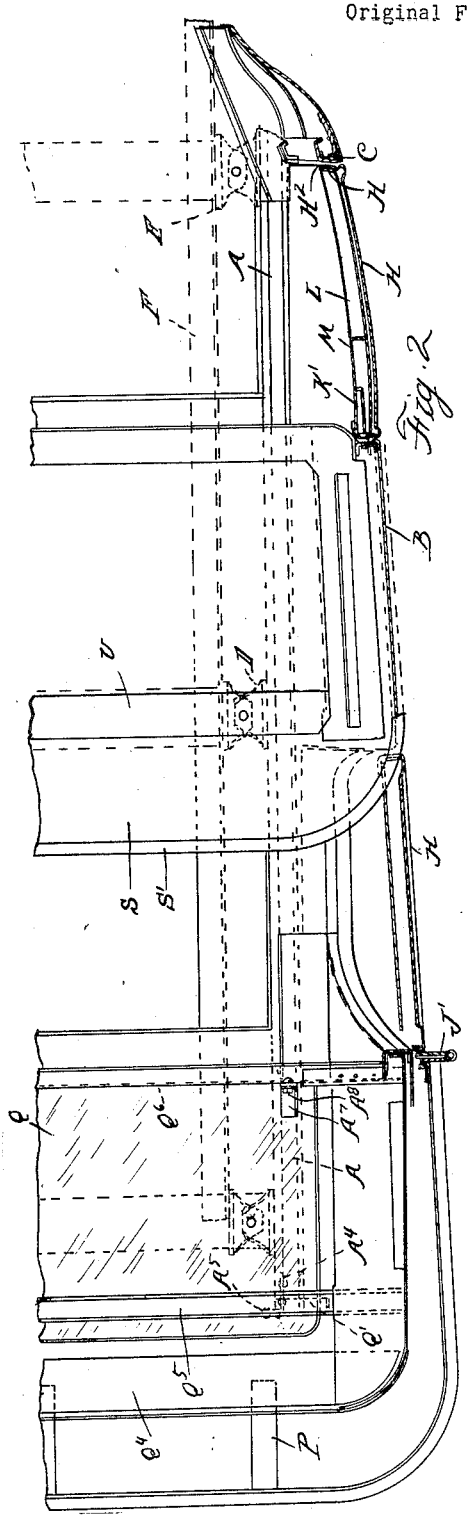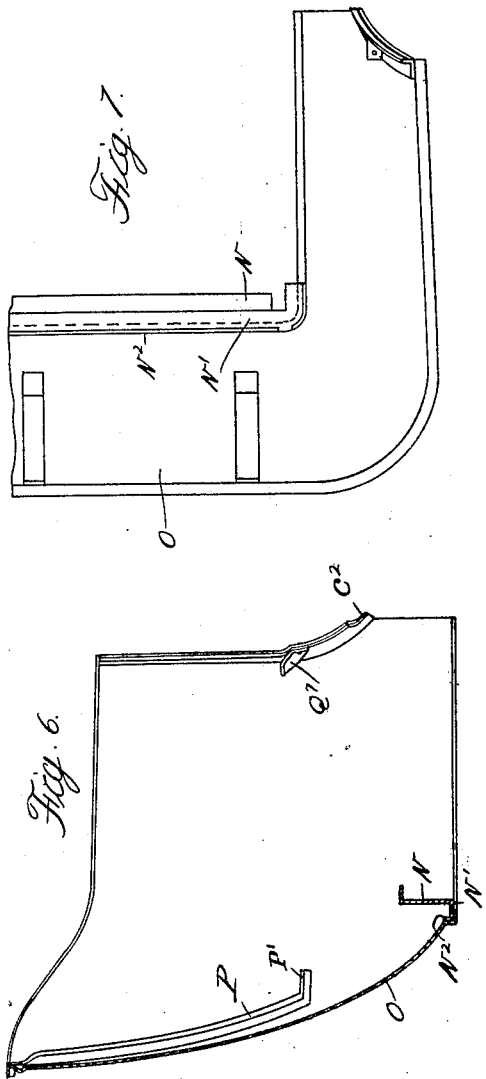

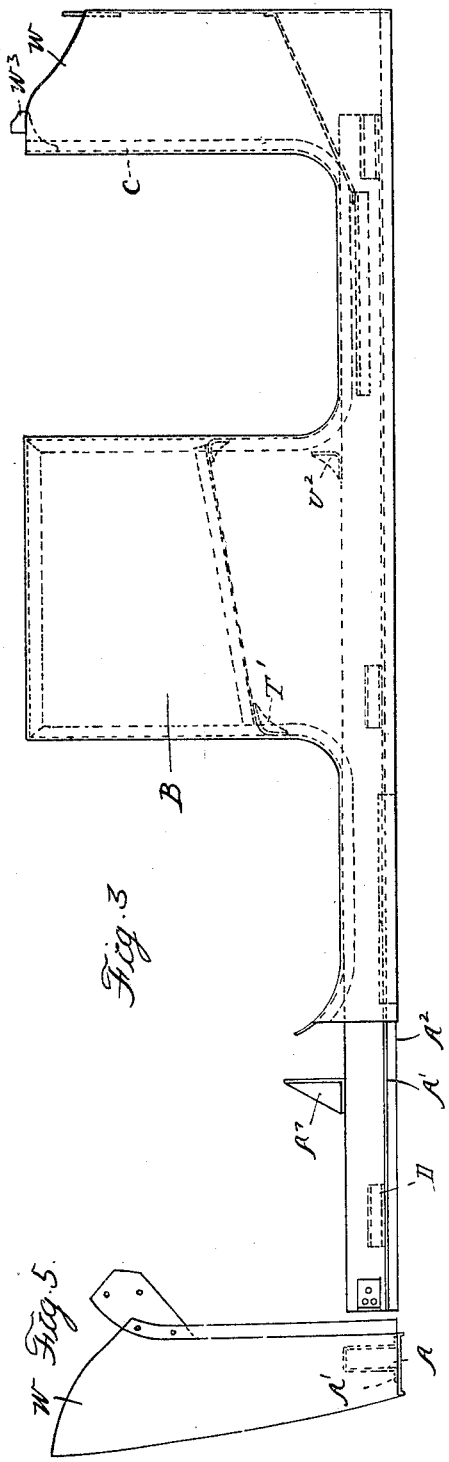
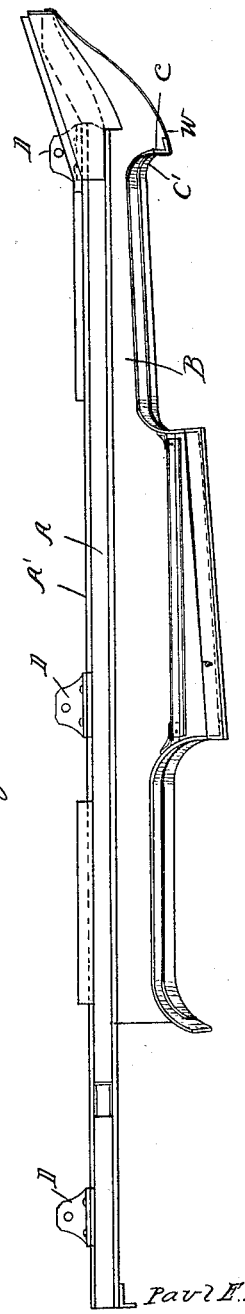

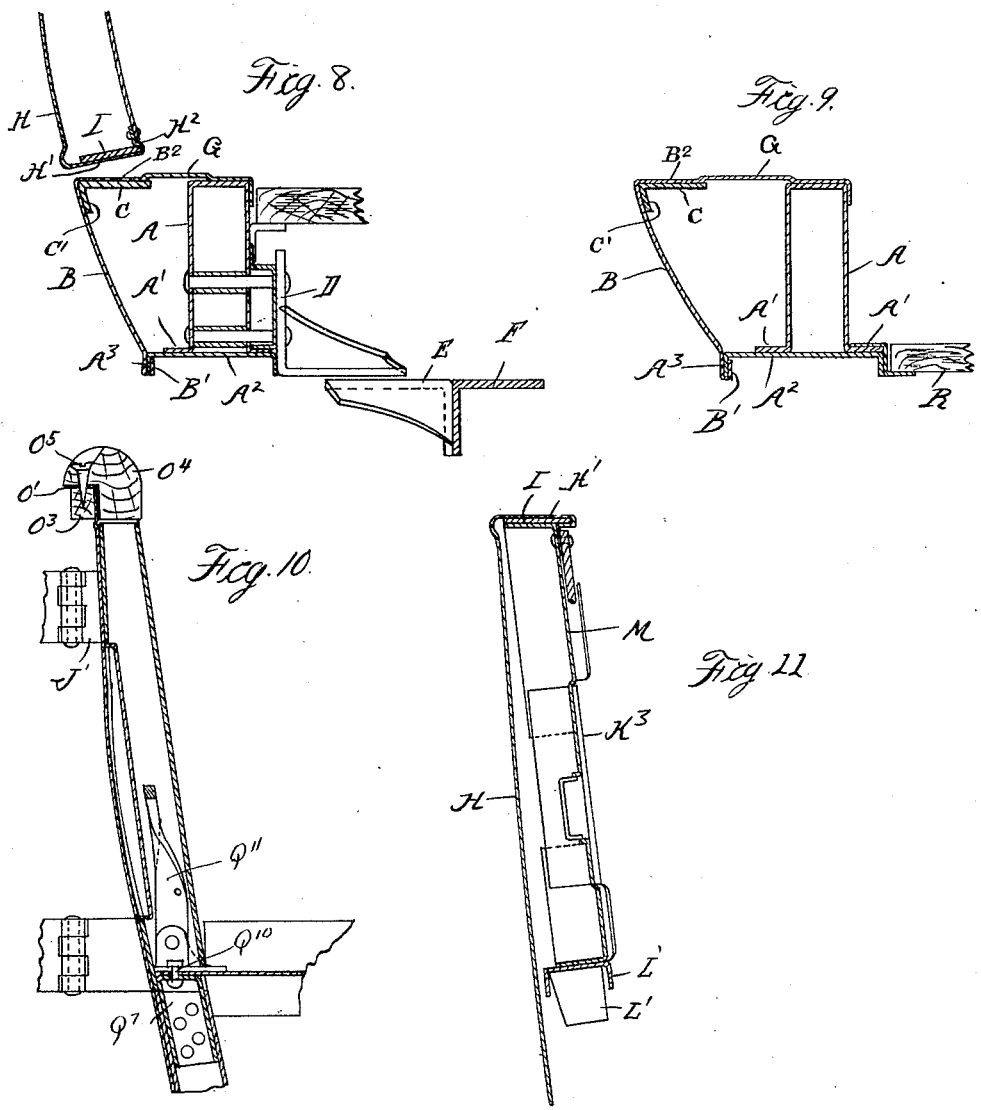

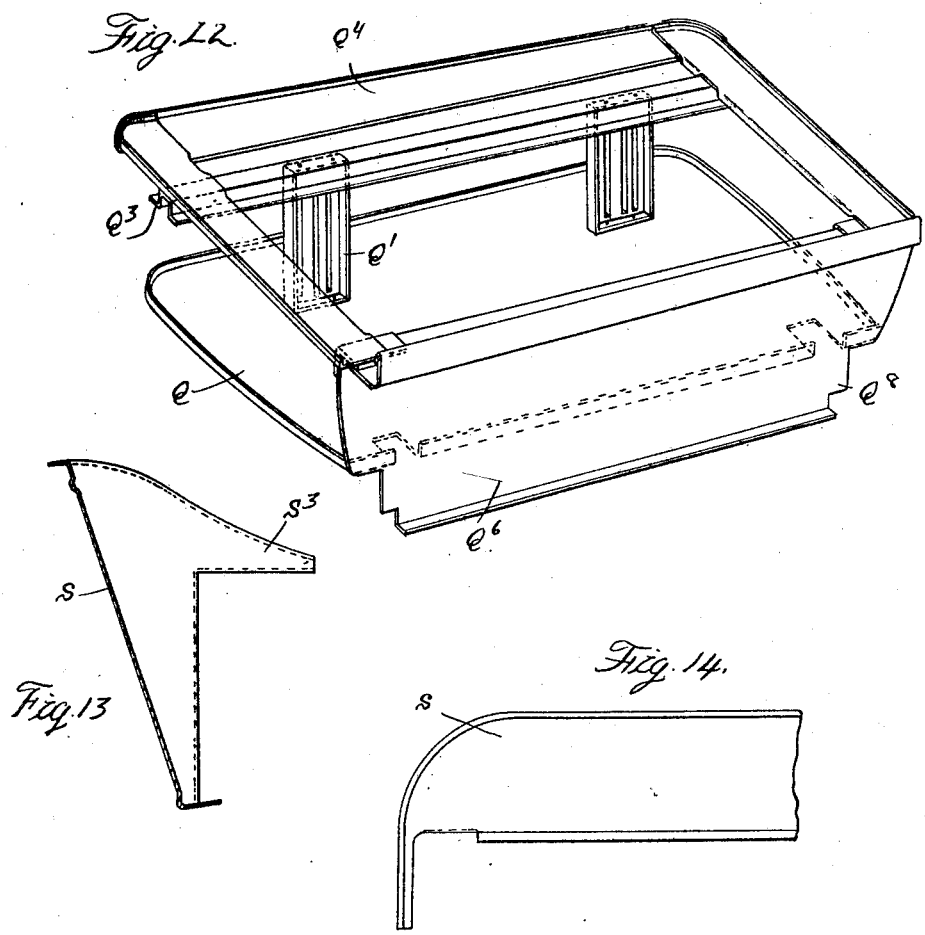

1,659,350

UNITED STATES PATENT OFFICE.

PAUL E. BRENEMAN, OF DETROIT, MICHIGAN, ASSIGNOR TO C. R. WILSON BODY COMPANY, OF DETROIT, MICHIGAN, A CORPORATION OF MICHIGAN.

METALLIC-FRAMED SECTIONAL VEHICLE BODY.

Application filed January 16, 1920, Serial No. 351,806. Renewed October 3, 1925.

The invention relates to metallic vehicle bodies of a type composed of separately assembled sections or units which may be quickly assembled to form the complete structure. It is the primary object of the invention to avoid the use of non-metallic elements in the reinforcement of the several units and in the formation of the body frame. It is a further object to obtain a simple, light and strong construction which is easily manufactured and assembled at relatively small cost.

In the drawings:

Figure 1 is a vertical longitudinal section through the assembled body;

Figure 2 is a plan view of one-half the body;

Figure 3 is a side elevation of the side panel unit;

Figure 4 is a plan view thereof;

Figure 5 is a front elevation;

Figure 6 is a longitudinal section through the tonneau unit;

Figure 7 is a plan view thereof;

Figures 8, 9, 10 and 11 are cross-sections respectively on lines 8—8, 9—9, 10—10 and 11—11 of Figure 1;

Figure 12 is a perspective view of the rear seat unit;

Figure 13 is a section through the back unit for the forward seat; and

Figure 14 is a plan view thereof.

My invention is applicable to various specific constructions of body and to various unit groupings, but I shall confine my description to the one specific construction illustrated in the drawings. In this construction the body is composed essentially of the following units: Two side panels, a tonneau unit, doors, rear seat, front seat back, heel and toe boards, and cowl top panel. These in conjunction with a few minor parts constitute the entire body and all of the units are standardized, so as to be interchangeable in different assemblies.

Side panels.

These units are made right and left and each comprises, essentially, a sill member A, an outer sheet or panel member B having door openings therein with inturned border flanges, and reinforcements C extending around the sides and bottom of the door openings. The sills A are preferably formed of inverted channel members having laterally extending foot flanges A', together with a lower inverted channel member $A^2$ of somewhat greater width, but of slight depth. The outer depending flange $A^3$ of the channel member $A^2$ is engaged by a return-bent flange at the lower edge of the panel B, as indicated at B'. The sills A are supported upon the chassis frame of the vehicle by suitable angle brackets such as D, which are riveted to the inner side of each sill and overlap brackets E secured to the chassis sill F. The reinforcements C for the door openings are preferably formed of angle bars having the flanges C' thereof arranged parallel to the panel B and the other flange parallel to the inturned flange $B^2$ of the outer panel. The reinforcements C are substantially U-shaped extending parallel to each side and across the bottom of the door opening, and a threshold plate G is arranged to cover the space between the members C and the sill A at each door opening. The forward end of the panel B is fashioned to curve inward so as to meet the hood of the vehicle and to join with the cowl, this portion extending together with the sub-sill $A^2$ beyond the forward ends of the sills A. Thus, the side panel unit is given the requisite contour and is so attached to the sills and otherwise reinforced as to maintain proper rigidity.

Door members.

The door members H are formed of an outer panel having inturned flanges H' on top, bottom and sides, which flanges are also bent at $H^2$ to extend inward parallel to the outer panel. I is a reinforcing member, preferably formed of flat bar stock, bent to extend completely around the door, lying parallel to the flanges H'. At suitable points the reinforcement I in the flanges H' are depressed to form recesses J, which receive the hinges J', and a similar recess is formed at K adjacent to the latch bolt K'. The opposite ends of the reinforcement I are located adjacent to the latch bolt K' and are spaced from each other a sufficient distance for the passage therebetween of said latch bolt. L is a central reinforcing member extending horizontally across the door between the sides thereof. This member is preferably a channel bar having flanges L' at its ends which are secured to the reinforcement I. M is a pan-shaped housing member which is located in the space above the cross bar L and between the same and the top of the door. This housing encloses the latch bolt K' and is cut away sufficiently for the insertion of said latch bolt therein and for also providing clearance for the operating lever $K^2$. The plate $K^3$ on which the bolt K' and lever $K^2$ are mounted is itself located in the depression in the pan-shaped member and secured thereto by riveting, or otherwise.

Tonneau unit.

This unit comprises a cross sill member N, which is preferably a Z-bar and is of a length to extend between the channel members A at the rear ends thereof. The bottom flange N' of the Z-bar has an up-turned portion $N^2$ to which is attached the rear panel O of the tonneau. This panel is preferably formed in several sections suitably fashioned and joined to each other so as to extend across the back and around the sides to a point adjoining the side panels B. As shown, this point of junction is adjacent to the rear side of the door opening so that a portion of the door frame is formed in the tonneau unit and a complementary portion in the side panel unit. Each of these portions is reinforced by an angle member C, as previously described, and the adjacent ends of the reinforcements are secured to each other by a tongue $C^2$ on the one overlapping the web of the other and secured by a bolt $C^3$. At the top the panel sections O are provided with an out-turned flange O' reinforced by an outwardly opening channel member $O^2$ and which is adapted to receive a wooden trim rail such as $O^3$. The top edge is suitably curved to extend from the back to the sides, terminating in a portion for receiving a wooden trim rail $O^4$, which is rabbeted to fit over the flange O' and is secured thereto by screws $O^5$ passing through the flange and into the trim rail $O^3$. P are reinforcing channel bars, which are secured to the panel O at their upper ends and which at their lower ends have inturned portions P' for supporting the rear edge of the seat.

Rear seat unit.

This unit comprises a sheet metal floor board Q which extends across within the tonneau with a slight clearance from the sides and back thereof and rests upon the side sills A and rear sill N. Rising from the floor board Q are the struts or posts Q', to which is secured a transversely extending channel member or double Z-bar $Q^3$. $Q^4$ is an annular seat frame which is supported above the floor board Q upon the cross member $Q^3$. At its front the seat frame is secured to a heel board $Q^6$ which extends downward to the floor board Q below the same and between the side panels. There are also provided brackets $Q^7$ upon the reinforcing member C of the side panel unit, which support the seat frame $Q^4$ and form a means of attachment to the side units. A plate $Q^8$ depending from the floor board Q at the front edge thereof forms a complementary portion of the heel board and is provided with a forwardly extending flange for passing under the floor boards R extending between the side sills.

Front seat back and associated elements.

This unit comprises a sheet metal back member S which extends across between the side units and above the same, being provided at its upper edge with a channel member S' for receiving the trim rail $S^2$, and also having forward extensions $S^3$ which extend over the top of the side panels. Below this member S is a toe board T which extends in inclined position and is secured at its opposite ends to brackets T' on the angle members C. U is an apertured front seat frame extending across between the side panels, being supported at its rear end on the brackets T' and at its forward end upon a heel board U'. Wooden trim rails V are secured to the sides of the seat frame and trim rails V' are secured to the channels C, which in cooperation with the trim rails $S^2$ on the back member and trim rails $V^2$, similar to the trim rails $O^4$, form the means of securing the upholstery. All of these wooden trim rails are detachably secured and are only placed in position during the assembling of the body.

Cowl member.

This consists in a pressed sheet metal member W which extends between the side panels and at its opposite ends is conformed to the upper edges of said panels. The rear edge is reinforced by an angle bar W' with a finishing strip $W^2$, which has its edges turned over the flange of the reinforcing bar and the edge of the member W. The bar W' is attached to a bracket member $W^3$ which is secured to the top of the side panel.

The construction of the several units being as above described, it will be understood that only the metal parts are first assembled and that the enameling and any other operations requiring heat treatment are performed on the units while in this condition. When the body is to be finally assembled, the several units are attached to each other as follows:

The side panels are attached to the tonneau by bolting the Z-bar N to the sills A. This is accomplished by angle brackets $A^4$ which are riveted, or otherwise secured, to the members A and have flanges $A^5$ provided with apertures therein registering with apertures in the Z-bar and receiving clamping bolts $A^6$. The side panel member B, which terminates short of the rear end of the sill members A, adjoins the side members of the tonneau unit and the joint between the two is formed by inturned flanges X and X' on the respective members and reinforcing angles $X^2$ and $X^3$, these parts being secured to each other by bolts $X^4$. The segment of the angle reinforcements C for the rear door frame, which is a part of the side panel assembly, is secured to the segments C' of said reinforcements, forming a part of the tonneau assembly, by means of the bolts $C^3$ which clamp together the overlapping tongues $C^2$.

The rear seat assembly is secured by bolts $Q^9$ which attach the floor board Q and strut members Q' to the Z-bar N. Also bolts $Q^{10}$ attach the forward portion of the seat to the brackets $Q^7$ and at the same time secure in position the top iron $Q^{11}$. The heel board $Q^6$ is attached to brackets $A^7$ upon the sill members A by means of bolts $A^8$, and the upper end of said heel board is flanged to be secured with the seat of the brackets $Q^7$ by the bolts $Q^{10}$. The ends of the double Z-bar $Q^3$ have secured thereto the fender supporting brackets Y by means of the bolts Y'.

The toe board T is secured to the brackets T' and the heel board U' is bolted to brackets $U^2$. The seat frame U is then supported by and secured to said toe and heel boards and the seat back S is secured to the side panels. The other auxiliary parts are then secured in position which will complete the metallic portions of the structure. After the body has been enameled, wooden rails are attached thereto, after which the body is ready to receive the upholstery.

What I claim as my invention is:

1. In a metallic vehicle body, a side panel unit comprising a straight sill member of inverted channel cross-section, a sub-sill member secured to the base of the main sill and having its outer edge conforming to the longitudinal contour of the panel and provided with a depending flange, and an outer panel member having its lower edge secured to said depending flange.

2. In a metallic vehicle body, a side panel unit comprising a sill member of inverted channel cross-section having outwardly extending foot flanges, a sub-sill member of shallow inverted channel cross-section secured to said foot flanges, the outer edge of said sub-sill being conformed to the longitudinal contour of the side panel, and an outer side panel member having its lower edge return-bent to embrace the depending flange at the outer edge of said sub-sill.

3. In a metallic vehicle body, a side panel unit comprising a sill member of inverted channel cross section having laterally-extending foot flanges, a sub-sill of shallow inverted channel cross-section secured to said foot flanges, an outer panel having a door opening therein with an inturned flange surrounding the same, the lower edge of said panel being return-bent and secured to the depending outer flange of said sub-sill, a reinforcement surrounding said door opening and secured to said inturned flange, and a threshold plate extending across the space between said reinforcement for the door opening and the sill.

4. In a metallic vehicle body, a side panel unit comprising a sill member of inverted channel cross section and provided with laterally extending foot flanges, a sub-sill of shallow inverted channel cross-section secured to said foot flanges, an outer panel member having a door opening therein with an inturned flange surrounding said door opening, and an inturned flange at the upper edge of the panel, the lower edge of said panel being return-bent to embrace the outer depending flange of said sub-sill, said panel and sub-sill extending forward beyond the end of the main sill and being inwardly bent to form a portion for meeting the hood.

5. In a metallic vehicle body, the combination with a pair of side panel units, each having a sill member extending longitudinally thereof, of a tonneau unit complementary to said side panel units provided with a cross sill, the opposite ends of said cross sill abutting against said side sill, and angle brackets for attaching said side sills and cross sills to each other.

6. In a metallic vehicle body, the combination with a pair of side panel units, each having a sill extending longtudinally thereof, of a tonneau unit provided with a cross sill formed of a Z-bar, said cross sill extending between said side sills and the lower flange of the Z-bar being provided with an upturned flange secured to the rear panel of the tonneau, and angle brackets for securing the web portion of said Z-bar to said sill members.

7. In a metallic vehicle body, the combination with a pair of side panel units, of a tonneau unit complementary thereto, the plane of junction between said units lying within the rear door opening, sills secured to said side panel units, a cross sill on said tonneau unit having its opposite ends secured to said side sills, and a reinforcement for the rear door opening formed in sections respectively secured to said side panel and tonneau units said reinforcement sections having their adjacent ends overlapping and secured to each other.

8. In a metallic vehicle body, the combination with the side panel units, each provided with a longitudinally extending sill, of a tonneau unit provided with an outer panel member extending around the back and to the sides, a cross sill secured to said panel unit and attached at its opposite ends to the sills of the side panel units, a reinforcement rail along the upper edge of said side panel, reinforcement bars secured at their upper ends to said reinforcement rail and depending therefrom inside of said panel, the lower ends of said bars having forward extensions, and a seat unit supported within said tonneau section and engaging said forward extensions.

9. In a metallic vehicle body, the combination with side panel units having longitudinally extending sills and a tonneau unit provided with a cross sill secured at its opposite ends to said side sills, of a rear seat unit comprising a floor board extending across the tonneau unit and supported on said side sills and cross sill, struts rising from said floor board above said cross sill, a heel board at the forward end of said floor board rising thereabove, and a seat frame supported on said struts and heel board.

10. In a metallic vehicle body, the combination with side panel units having longitudinally extending sills, of a tonneau unit provided with a cross sill secured at its opposite ends to said side sills, and a seat unit within said tonneau unit comprising a floor board extending across and supported upon said side sills and cross sill, struts rising from said floor board above said cross sill, a heel board rising from the forward edge of said floor board, a cross bar secured to the upper ends of said struts and extending to the sides of the tonneau and forming a support for the fender irons, and a seat frame supported on said cross bar and heel board.

11. In a metallic vehicle body, the combination with side panel units, each having a longitudinally extending sill, of a tonneau unit provided with a cross sill extending between and secured to said longitudinally extending sills, and a rear seat unit within said tonneau unit comprising a floor board supported on said longitudinal and cross sills, struts rising from said floor board above said cross sill, a heel board at the forward end of said floor board and rising thereabove, reinforcement bars for the back of the tonneau unit secured to the upper edge thereof and depending therefrom, the lower ends of said bars extending forward, a cross bar supported on said strut members and extending to the sides of the tonneau unit forming supports for the fender irons, and a seat frame resting upon said cross bar, heel board and forward extensions of said back reinforcement bars.

12. In a metallic vehicle body, the combination with side panel units having longitudinally extending sills and a tonneau unit provided with a cross sill extending between and secured to said side sills, said units adjoining each other in a plane passing through the rear door opening, reinforcing bars surrounding the door opening and formed in sections secured to the respective units and overlapping and secured to each other, a heel board extending across the tonneau unit, brackets on the side sills to which said heel board is secured, brackets on said reinforcements for the door openings, and a seat frame supported at its forward edge on said heel board and brackets projecting from said door opening reinforcements.

13. In a vehicle body, the combination with a side panel having a door opening therein, of a reinforcing member for the panel marginal to said opening, a toeboard supporting bracket carried by said reinforcing member, a heelboard in advance of said toeboard supporting bracket, and a seat frame supported by said bracket and heelboard.

14. In a vehicle body, the combination with a channel-shape sill, of a member closing the channel sill having a depending flange, a side panel secured to said flange having a door opening and an inturned flange marginal to said opening, a reinforcing member secured to said inturned flange, and a threshold member secured to said sill and reinforcing member.

In testimony whereof I affix my signature.

PAUL E. BRENEMAN.